US010543634B2

(12) United States Patent
Santais

(10) Patent No.: US 10,543,634 B2
(45) Date of Patent: Jan. 28, 2020

(54) METHOD FOR AUTOMATIC ADJUSTMENT OF THE TRAVEL OF A STRETCHING ROD OF A DEVICE FOR FORMING HOLLOW BODIES

(71) Applicant: SIDEL PARTICIPATIONS, Octeville-sur-Mer (FR)

(72) Inventor: Franck Santais, Octeville-sur-Mer (FR)

( * ) Notice: Subject to any disclaimer, the term of this patent is extended or adjusted under 35 U.S.C. 154(b) by 50 days.

(21) Appl. No.: 15/916,748

(22) Filed: Mar. 9, 2018

(65) Prior Publication Data
US 2018/0264706 A1 Sep. 20, 2018

(30) Foreign Application Priority Data

Mar. 17, 2017 (FR) .................................. 17 52200

(51) Int. Cl.
*B29C 49/12* (2006.01)
*B29C 49/06* (2006.01)
*B29C 49/78* (2006.01)
B29L 31/00 (2006.01)

(52) U.S. Cl.
CPC .............. *B29C 49/12* (2013.01); *B29C 49/06* (2013.01); *B29C 49/78* (2013.01); *B29C 2049/129* (2013.01); *B29C 2949/7805* (2013.01); *B29C 2949/78563* (2013.01); *B29L 2031/712* (2013.01)

(58) Field of Classification Search
CPC .............. B29C 49/12; B29C 2049/129; B29C 2949/78563
See application file for complete search history.

(56) References Cited

U.S. PATENT DOCUMENTS

| 6,576,171 | B1 | 6/2003 | Devenoges | |
|---|---|---|---|---|
| 8,865,036 | B2 | 10/2014 | Finger | |
| 2010/0078861 | A1* | 4/2010 | Herklotz | B29C 49/12 264/532 |
| 2010/0156009 | A1* | 6/2010 | Voth | B29C 49/4236 264/523 |
| 2017/0157834 | A1 | 6/2017 | Protais | |

FOREIGN PATENT DOCUMENTS

EP 2 460 638 A2 6/2012
WO 2016/005682 A1 1/2016

OTHER PUBLICATIONS

FR Search Report, dated Nov. 10, 2017, from corresponding FR application No. 1752200.

* cited by examiner

Primary Examiner — Robert B Davis

(57) ABSTRACT

Disclosed is a method for adjusting the travel of a stretching sliding rod that belongs to a device for forming hollow bodies made of thermoplastic material by stretch blow molding, with the stretching rod being controlled cyclically in terms of sliding from a rest position to an adjustable stretching end position by stretching the malleable wall of a hollow body, before returning to its rest position to begin a subsequent stretching cycle of another hollow body, with the method including a control step that consists in detecting whether an axial force that opposes the sliding of the stretching rod at the end of travel is above a determined upper boundary. The stretching end position is adjusted automatically by being subjected to the axial force that is detected during the control step.

20 Claims, 2 Drawing Sheets

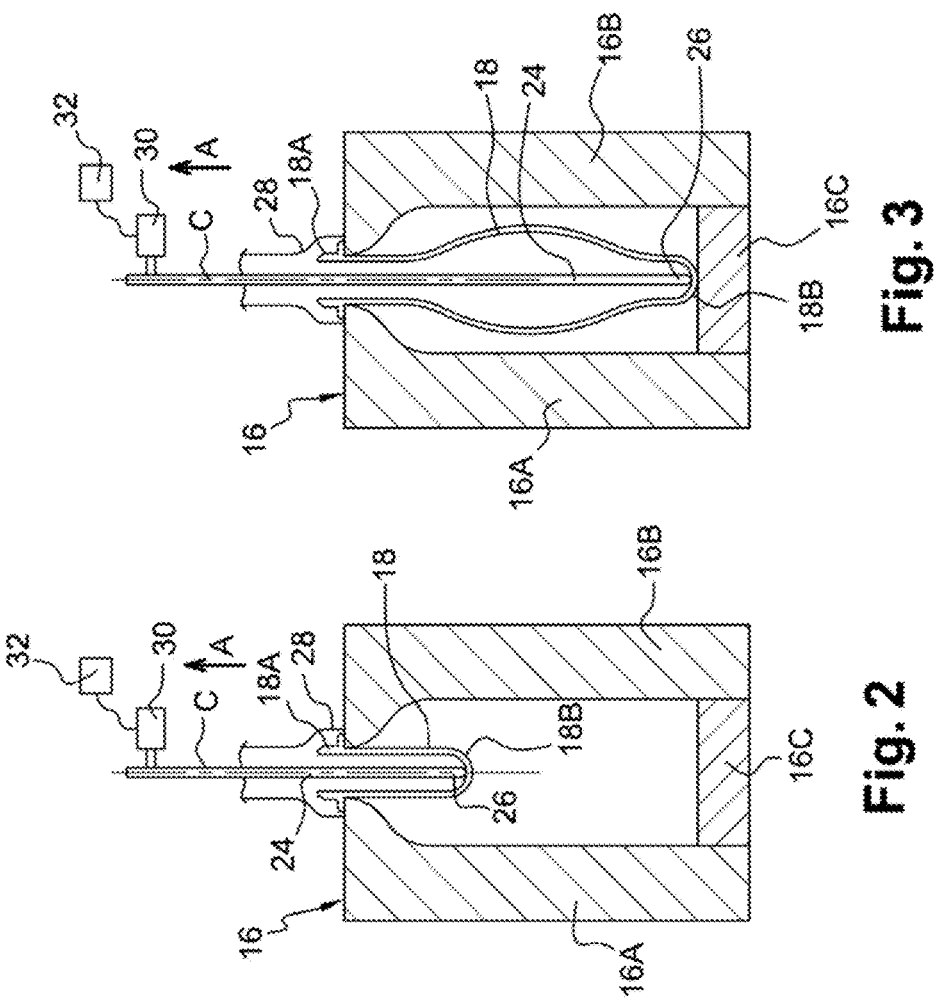

METHOD FOR AUTOMATIC ADJUSTMENT OF THE TRAVEL OF A STRETCHING ROD OF A DEVICE FOR FORMING HOLLOW BODIES

The invention relates to a method for controlling a sliding stretching rod that belongs to a device for forming hollow bodies made of thermoplastic material by stretch blow molding.

The invention relates more particularly to a method for adjustment of the travel of a sliding stretching rod that belongs to a device for forming hollow bodies made of thermoplastic material by stretch blow molding, with the stretching rod being controlled cyclically in terms of sliding from a rest position to an adjustable stretching end position so as to stretch the malleable wall of a hollow body, before returning to the rest position to begin a cycle following stretching of another hollow body, with the method comprising a control step that consists in detecting whether an axial force that opposes the sliding of the stretching rod at the end of travel is above a determined upper boundary.

TECHNICAL BACKGROUND OF THE INVENTION

It is known to form containers made of thermoplastic material by the stretch blow molding of preforms that are heated in advance to a temperature that is high enough to soften the walls thereof.

For this purpose, a forming device is used that comprises a mold that has a cavity in accordance with the impression of the container that is to be obtained. The previously heated preform is accommodated in the cavity. Then, its walls are subjected to a so-called "biaxial" stretching to assume the impression of the mold. To do this, the preform is stretched axially by means of a stretching rod to bring about the axial expansion of the preform. Simultaneously to this stretching operation, a pressurized fluid is injected into the preform in such a way as to bring about the radial expansion of the wall.

Such a forming method is well known. So that the final container has a perfectly molded bottom, it is preferable that the stretching rod brings the bottom of the preform into contact with the mold bottom. It is preferable that the wall that forms the bottom of the preform is slightly pinched between the free end of the stretching rod and the mold bottom.

For the large-scale production of containers, it is known to use a blow-molding machine, in particular a rotary blow-molding machine, which is equipped with a number of forming devices of this type.

Furthermore, such a forming device is very expensive. To make it possible for container manufacturers to maximize their returns from this equipment, the same molding device is designed for making it possible to produce containers of different formats by replacing certain so-called "personalizable" elements, such as the molding elements.

To reduce the manufacturing cost of such a machine, certain components are used independently of the format of the container that is to be produced. This is in particular the case of the drive element of the stretching rod. Thus, it is provided to be able to adjust the travel of the stretching rod based on multiple parameters, among which there will be cited by way of non-limiting examples the format of the container that is to be produced and the thickness of the wall of the preform.

To date, the adjustment of the travel of the stretching rod is carried out by an operator who, in preparation for the production of a series of containers of a determined format, programs, for example, a control unit of the stretching rod to make it slide on a determined course.

However, it may happen that the operator makes an error or else that the thickness of the bottom wall of the preforms and/or the dimensions of the molds are not in compliance with the specifications.

In this case, it may happen that the stretching rod abuts against the mold bottom and/or that it forces the preform wall too heavily against the mold bottom. To prevent the motor for controlling the sliding of the stretching rod from being damaged, in particular because of overheating, and to prevent the containers that are obtained from having anomalies, it is known to monitor the axial force exerted by the stretching rod on the preform, in particular close to its stretching end position.

When the axial force that is detected is too high, it is considered that the travel of the stretching rod is too long. It is generally expected that an abnormally high axial force occurs several times before a problem is indicated, in particular to avoid temporary anomalies.

When the problem is indicated, the operator stops the intake of preforms in the blow-molding machine, and then the blow-molding machine is halted in such a way as to correct manually the length of the travel of the stretching rod.

During this operation, the preforms that are already present in the blow-molding machine are scrapped because they were not able to have been formed correctly. This operation therefore leads to the raw material being wasted.

In addition, such an operation involves the total halting of the production line for the period that is necessary to correct the travel. This operation therefore leads to a loss of time.

BRIEF SUMMARY OF THE INVENTION

The invention proposes a method of the type that is described above, characterized in that the stretching end position of a cycle following stretching is automatically adjusted by being subjected to the axial force that is detected during the control step.

Such a method makes it possible in particular to correct automatically the travel of the stretching rod without having to stop the production of hollow bodies. Actually, the object of said detection is to know whether the axial force at the time when the stretching rod reaches the programmed stretching end position for the stretching of a hollow body is above a determined upper boundary. Said detection is then used to automatically correct, if necessary, the stretching end position that is programmed for a subsequent cycle for stretching another hollow body. In addition, this method also makes it possible to save raw material by adapting the travel of the stretching rod to the benefit of preforms that are already present in the blow-molding machine at the time of the correction of the travel.

According to other characteristics of the invention:
In the case of detection of an axial force that is above the upper boundary after at least one cycle of use, the stretching end position is offset by a determined first distance that is set back from the preceding stretching end position during a step for correcting the travel of the stretching rod;
If, for at least one cycle, the axial force that opposes the sliding of the stretching rod at the end of travel is below a determined lower boundary, a step for adapting the travel of the stretching rod is initiated during which the stretching end position is offset beyond the preceding stretching end position by a determined second distance;

The second distance is less than the determined first distance;

The method is repeated until the axial force remains below the determined upper boundary for at least one cycle;

The method is repeated until the axial force is between the lower boundary and the upper boundary determined during the end of travel of the stretching rod;

The stretching rod is controlled in terms of sliding by an electric motor;

The axial force is estimated starting from the value of the intensity of the current consumed by the electric motor; for example, the determination of whether the axial force that is opposing the sliding of the stretching rod at the end of travel is above a determined upper boundary can then consist in determining whether the intensity of the current that is consumed by the drive motor of the stretching rod is above an upper boundary of corresponding current intensity. The determination can also use a continuous or intermittent measurement of the intensity of the current that is consumed by the drive motor of the stretching rod, to derive from it an estimated value of the axial force at the time when the stretching rod reaches the stretching end position that is programmed for the cycle that is in progress;

The molding device comprises a mold bottom, with a bottom of the hollow body being designed to be slightly crushed between the stretching rod in the stretching end position and the mold bottom, in such a way that the crushing axial force is between the lower boundary and the upper boundary; for example, the determination of whether the axial force that opposes the sliding of the stretching rod at the end of travel is between the predetermined lower boundary and upper boundary can then consist in determining whether the intensity of the current that is consumed by the drive motor of the stretching rod is between a corresponding lower boundary and upper boundary of current intensity;

The stretching end position can be adjusted automatically, for example by means of an electric motor.

According to another aspect, the invention also relates to a device for forming hollow bodies made of thermoplastic material by stretch blow molding for implementing the above-mentioned method, comprising:

A stretching sliding rod;

Means for adjusting the travel of the stretching sliding rod;

Control means that are designed to control cyclically in terms of sliding the stretching rod from a rest position to an adjustable stretching end position so as to stretch the malleable wall of a hollow body, before returning to its rest position to begin a cycle following the stretching of another hollow body;

Control means that are designed to detect whether an axial force that opposes the sliding of the stretching rod at the end of travel is above a determined upper boundary;

in which the control means are designed to estimate the axial force that opposes the sliding of the stretching rod (24) at the end of travel, and in which said means for adjusting the travel comprise means for automatic subjecting of the stretching end position to the axial force that is measured at the end of stretching travel of a preceding hollow body, whereby the adjustment means automatically adjust the stretching end position.

Advantageously, the stretching rod is controlled in terms of sliding by an electric motor.

Advantageously, the axial force is estimated starting from the value of the intensity of the current that is consumed by the electric motor.

BRIEF DESCRIPTION OF THE FIGURES

Other characteristics and advantages of the invention will emerge during the reading of the following detailed description for the understanding of which reference will be made to the accompanying drawings in which:

FIG. 1 is a top diagrammatic view that shows a container manufacturing installation that comprises a blow-molding machine that can implement the control method carried out according to the teachings of the invention;

FIG. 2 is an axial cutaway view that shows one of the forming devices that equips the blow-molding machine of FIG. 1, with the stretching rod being in a stop position against the bottom of a hollow body, with the rest position of the stretching rod being shown in broken lines;

FIG. 3 is a view that is similar to that of FIG. 2, which shows the forming device in which the stretching rod occupies a stretching end position;

DETAILED DESCRIPTION OF THE FIGURES

Figure 5:
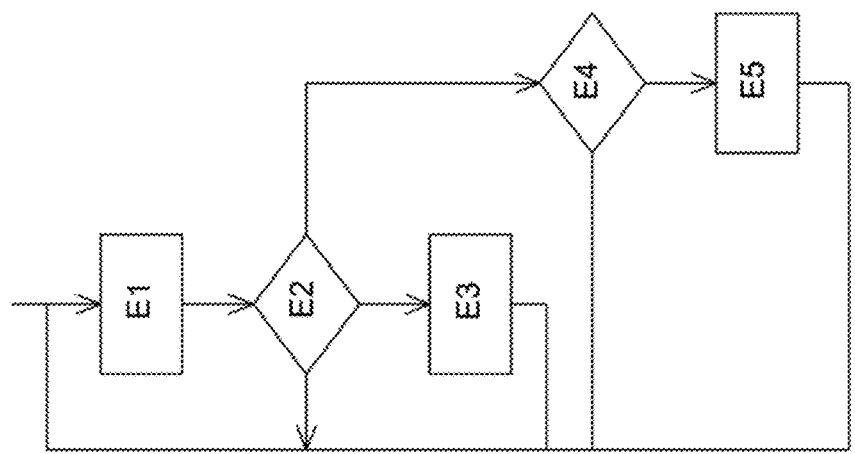
FIG. 5 is a block diagram that illustrates the control method that is carried out according to a second embodiment of the invention.

In the remainder of the description, elements that have an identical structure or similar functions will be referred to by the same reference.

In the remainder of the description, an axial direction that is indicated by the arrow "A" of the figures and that is oriented from bottom to top, as well as radial directions that are orthogonal to the axial direction, will be adopted in a non-limiting manner.

A machine 10 for forming hollow bodies in bulk was shown in FIG. 1. It involves, for example, a rotary blow-molding machine that comprises a carrousel 12 that rotates around a central axis "B" of axial orientation. The carrousel 12 carries a number of forming devices 14 that are arranged uniformly on its periphery. During normal operation of the machine 10, the carrousel 12 is driven in continuous rotation, for example by a motor (not shown).

In the remainder of the description, the term "hollow body" will be used interchangeably to refer to a preform or a container during molding.

Each forming device 14 is intended to transform a hollow body 18, in particular a preform, made of thermoplastic material, heated to a temperature that is high enough to make its wall malleable, in a final container (not shown) by stretch blow molding. The forming of the hollow body takes place during the rotation of the carrousel 12 between a loading zone 20 and an unloading zone 22. In each rotation of the carrousel 12, a forming device 14 transforms a hollow body 18 into the final container.

Each forming device 14 comprises a mold 16 that is produced in three parts here, namely two half-molds 16A, 16B that radially delimit a final container impression and a mold bottom 16C that axially delimits the impression of the final container downward.

Each forming device 10 is designed to accommodate a hollow body 18 when it is brought by rotation of the carrousel 12 to the loading zone 20 as is illustrated in FIG. 1. As is shown in FIG. 2, the hollow body 18, here a preform, has a main axis "C" of axial orientation. The hollow body 18 is open axially upward by a neck 18A that empties into the outside of the mold 16. The hollow body 18 is closed axially downward by a lower bottom 18B. The mold bottom 16C is arranged axially on a level with the bottom 18B of the hollow body 18.

To make possible the forming of the hollow body, the forming device 14 comprises a stretching rod 24 that extends axially up to a free lower end 26. The stretching rod 24 is mounted to slide axially between an upper rest position that is shown in broken lines in FIG. 2 and a lower stretching end position that is shown in FIG. 3.

The stretching rod 24 has as its function to stretch the side wall of the hollow body 18 axially by resting against the bottom 18B of the hollow body 18.

Each forming device 14 also comprises a blow-molding nozzle 28 that is designed to inject a pressurized fluid into the hollow body 18 to make possible its radial expansion.

The combined use of the stretching rod 24 and the blow-molding nozzle 28 thus makes it possible to form the final container by flattening the wall of the hollow body 18 against the impression of the mold 16.

During the forming of a hollow body, the stretching rod 24 is controlled according to a cycle that consists in sliding the stretching rod 24 from its rest position to a stop position against the bottom 18B of the hollow body 18, as illustrated in FIG. 2, and then in continuing, preferably without interruption, the sliding to stretch the wall up to its stretching end position in which the bottom 18B of the hollow body 18 is slightly crushed between the free end 26 of the stretching rod 24 and the mold bottom 16C. Then, the stretching cycle is completed by a return of the stretching rod 24 to its rest position to begin a cycle following stretching of another hollow body.

The stretching rod is thus controlled cyclically in terms of sliding.

The stretching end position of the stretching rod 24 is adjustable to make it possible to adapt the travel in terms of sliding of the stretching rod 24 with various models of molds 16 and/or with various thicknesses of the bottom 18B of the hollow body 18. In contrast, the rest position of the stretching rod 24 remains stationary.

The stretching rod 24 is controlled here in terms of sliding by an electric motor 30. The electric motor 30 is driven by an electronic control unit 32.

The stretching end position is able to be adjusted automatically, here by means of an electric motor.

The stretching end position is produced here by programming the electronic control unit 32 of the electric motor 30. Thus, the stretching end position is not determined by a mechanical stop, but by halting the electric motor 30 when the stretching rod 24 reaches its stretching end position.

As a variant, not shown, the stretching end position is produced by a mechanical stop that can be adjusted axially, for example by means of another electric motor. In this case, the stretching rod can be moved in terms of sliding by other means, for example by pneumatic or hydraulic means.

It may happen that the stretching end position is not adjusted correctly and that the free end 26 of the stretching rod 24 abuts against the mold bottom 16C, or at least exerts too high a pressure on the bottom 18b of the hollow body. In this case, the electric motor 30 that controls the sliding runs the risk of being damaged, for example by overheating. In addition, the final containers run the risk of not being in line with expectations, for example because of too thin a bottom, and even a bottom that is pierced by the pressure exerted by the stretching rod.

For this purpose, the method for controlling the stretching rod 24 comprises a control step that consists in detecting whether an axial force that opposes the sliding of the stretching rod 24 is above a determined upper boundary. When the stretching rod 24 is controlled in terms of sliding by an electric motor 30, as is the case here, said axial force is estimated starting from the value of the intensity of the current that is consumed by the electric motor 30, in particular at the end of travel.

To avoid having to stop the forming machine 10 in the case of detection of an adjustment defect of the stretching end position, the invention proposes that the adjustment of the stretching end position for the following stretching cycle be carried out automatically by subjecting the electric motor 30 to the axial force that is detected. Thus, a new stretching end position, so-called "adapted stretching end position," is programmed automatically by the electronic control unit 32 to replace the initial stretching end position.

Figure 4:
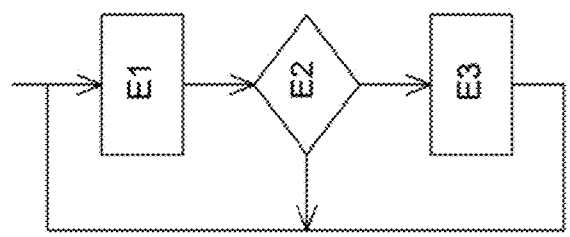
FIG. 4 is a block diagram that illustrates the control method that is carried out according to a first embodiment of the invention.

According to a first embodiment of the invention that is shown in FIG. 4, the method for adjusting the travel of the sliding rod 24 comprises a first step "E1" for detecting the axial force that opposes the sliding of the stretching rod 24 at the end of travel, i.e., close to its stretching end position.

During a second verification step "E2," the axial force that is detected during the first step "E1" is compared to an upper boundary.

If the detected axial force is below the upper boundary, it is considered that the stretching end position is correctly adjusted. The adjustment method is then repeated without modification of the initial stretching end position.

If the axial force that is detected is above the upper boundary, it is considered that the stretching end position is not correctly adjusted. The travel of the stretching rod 24 is then considered as being too long.

When the axial force that is detected exceeds the upper boundary during at least one cycle, a third correction step "E3" is initiated.

The third correction step "E3" is, for example, initiated when the axial force that is detected exceeds the upper boundary during several successive cycles, for example four or five cycles. The electronic control unit 32 then comprises a counter that is reinitialized each time that the detected axial force goes back below the upper boundary.

As a variant, the counter is reset to zero only after the detected axial force goes back below the upper boundary during a determined number of successive cycles.

According to another variant, the third correction step is initiated as soon as the detected axial force exceeds the upper boundary during a single cycle.

During the third step "E3" for correcting the travel of the stretching rod, the stretching end position is offset by a determined first distance "d1" that is set back, upward in reference to FIG. 3, in relation to the preceding stretching end position in such a way as to reduce the sliding travel of the stretching rod 24.

The method is reinitialized and repeated during subsequent cycles of use of the stretching rod 24, until the axial force is below the determined upper boundary.

In this first embodiment, the determined first distance "d1" that is set back is constant. It makes it possible to move upward by incrementing the stretching end position until the travel of the stretching rod 24 is correctly adjusted.

The determined first distance "d1" that is set back corresponds to, for example, the tolerance of the usually accepted adjustment during the adjustment of the stretching end position of the stretching rod 24. Thus, it is ensured that the stretching rod 24 will make it possible to bring the bottom 18B of the hollow body 18 close enough to the mold bottom 16C to make possible a correct molding of each final container. The first distance "d1" that is set back is, for example, less than or equal to the thickness of the bottom 18B of the hollow body 18.

A second embodiment of the invention was shown in FIG. 5.

This second embodiment proposes quickly approaching a suitable stretching end position while decreasing the amount of hollow body to be scrapped during the adjustment.

In this second embodiment, if, for at least one cycle following a third correction step "E3," the axial force that opposes the sliding of the stretching rod 24 at the end of travel is below a determined lower boundary, a step for adapting the travel of the stretching rod 24 is initiated during which the stretching end position is offset beyond the stretching end position, i.e., downward with reference to FIG. 3, from a determined second distance "d2" that is less than the determined first distance "d1."

Thus, the adjustment method comprises the same three steps "E1," "E2," and "E3" that are described in the first embodiment of the invention.

However, at the end of the second verification step "E2," if the detected axial force is below the upper boundary, instead of repeating the method without modification of the initial stretching end position, a fourth verification step "E4" is initiated.

During this fourth step "E4," the axial force that is detected during the first step "E1" is compared to a predetermined lower boundary.

If the axial force that is detected is above the lower boundary, it is considered that the stretching end position is correctly adjusted. The adjustment method is then repeated without modification of the initial stretching end position.

If the axial force that is detected is below the lower boundary, it is considered that the stretching end position is not correctly adjusted. The travel of the stretching rod 24 is then considered to be too short.

When the detected axial force is below the lower boundary during at least one cycle, a fifth adaptation step "E5" is initiated.

The fifth adaptation step "E5" is, for example, initiated when the detected axial force is below the lower boundary during a single cycle.

During the fifth step "E5" for adaptation of the travel of the stretching rod 24, the stretching end position is offset by a determined second distance "d2," downward in reference to FIG. 3, in relation to the preceding stretching end position in such a way as to increase the sliding travel of the stretching rod 24.

The method is repeated until the axial force is between the lower boundary and the upper boundary determined during the end of travel of the stretching rod 24.

The second distance "d2" is less than the first distance "d1," and it remains stationary.

As a variant, the first distance "d1" and the second distance "d2" can be decreased based on the number of repetitions of the correction and/or adaptation steps. This makes it possible in particular to prevent the stretching end position of the stretching rod 24 from being constantly modified without tending toward a stable position.

The method for automatic adjustment of the stretching end position of the stretching rod 24 according to any one of the previously-described embodiments advantageously makes it possible to adapt the travel of the stretching rod 24 quickly without having to stop the forming machine 10.

In addition, the travel of the stretching rod 24 is able to be adapted automatically by decreasing the amount of hollow body that is to be scrapped.

The invention claimed is:

1. Method for adjusting the travel of a stretching sliding rod (24) that belongs to a device (14) for forming hollow bodies (18) made of thermoplastic material by stretch blow molding, with the stretching rod (24) being controlled cyclically in terms of sliding from a rest position to an adjustable stretching end position so as to stretch the malleable wall of a hollow body (18), before returning to the rest position to begin a subsequent stretching cycle of another hollow body (18), with the method comprising a control step (E1) that consists in detecting whether an axial force that opposes the sliding of the stretching rod (24) at the end of travel is above a determined upper boundary;
   wherein the stretching end position of a subsequent stretching cycle is adjusted automatically by being subjected to the axial force that is detected during the control step (E1).

2. Method according to claim 1, wherein in the case of detection of an axial force that is above the upper boundary after at least one cycle of use, the stretching end position is offset by a determined first distance (d1) that is set back from the preceding stretching end position during a step (E3) for correcting the travel of the stretching rod (24).

3. Method according to claim 2, wherein if, for at least one cycle, the axial force that opposes the sliding of the stretching rod (24) at the end of travel is below a determined lower boundary, a step (E5) for adapting the travel of the stretching rod (24) is initiated during which the stretching end position is offset beyond the preceding stretching end position of a determined second distance (d2).

4. Method according to claim 3, wherein the second distance (d2) is less than the determined first distance (d1).

5. Method according to claim 3, wherein the method is repeated until the axial force remains below the determined upper boundary during at least one cycle.

6. Method according to claim 5, wherein the method is repeated until the axial force is between a lower boundary and the upper boundary determined during the end of travel of the stretching rod (24).

7. Method according to claim 6, wherein the molding device (14) comprises a mold bottom (16C), with a bottom (18B) of the hollow body (18) being designed to be slightly crushed between the stretching rod (24) in the stretching end position and the mold bottom (16C), in such a way that the crushing axial force is between the lower boundary and the upper boundary.

8. Device (14) for forming hollow bodies (18) made of thermoplastic material by stretch blow molding for implementing the method according to claim 1, comprising:
   A stretching sliding rod (24);
   Means for adjusting the travel of the stretching sliding rod (24);
   Control means that are designed to control the stretching rod (24) cyclically in terms of sliding from a rest position to an adjustable stretching end position so as to stretch the malleable wall of a hollow body (18), before returning to its rest position to begin a cycle following the stretching of another hollow body (18), Control means that are designed to detect whether an axial force that opposes the sliding of the stretching rod (24) at the end of travel is above a determined upper boundary;

wherein the control means are designed to estimate the axial force that opposes the sliding of the stretching rod (24) at the end of travel, and wherein said means for adjusting the travel comprise means for automatic subjecting of the stretching end position to the axial force that is measured at the end of stretching travel of a preceding hollow body, whereby the adjustment means automatically adjust the stretching end position.

9. Device according to claim 8, wherein the stretching rod (24) is controlled in terms of sliding by an electric motor (30).

10. Device according to claim 9, wherein the axial force is estimated from the value of the intensity of the current that is consumed by the electric motor (30).

11. Device according to claim 8, wherein the molding device (14) comprises a mold bottom (16C), a bottom (18B) of the hollow body (18) being designed to be slightly crushed between the stretching rod (24) in the stretching end position and the mold bottom (16C), in such a way that the crushing axial force is between a lower boundary and an upper boundary.

12. Method according to claim 1, wherein the method is repeated until the axial force remains below the determined upper boundary during at least one cycle.

13. Method according to claim 2, wherein the method is repeated until the axial force remains below the determined upper boundary during at least one cycle.

14. Method according to claim 4, wherein the method is repeated until the axial force remains below the determined upper boundary during at least one cycle.

15. Device (14) for forming hollow bodies (18) made of thermoplastic material by stretch blow molding for implementing the method according to claim 2, comprising:

A stretching sliding rod (24);

Means for adjusting the travel of the stretching sliding rod (24);

Control means that are designed to control the stretching rod (24) cyclically in terms of sliding from a rest position to an adjustable stretching end position so as to stretch the malleable wall of a hollow body (18), before returning to its rest position to begin a cycle following the stretching of another hollow body (18), Control means that are designed to detect whether an axial force that opposes the sliding of the stretching rod (24) at the end of travel is above a determined upper boundary;

wherein the control means are designed to estimate the axial force that opposes the sliding of the stretching rod (24) at the end of travel, and wherein said means for adjusting the travel comprise means for automatic subjecting of the stretching end position to the axial force that is measured at the end of stretching travel of a preceding hollow body, whereby the adjustment means automatically adjust the stretching end position.

16. Device (14) for forming hollow bodies (18) made of thermoplastic material by stretch blow molding for implementing the method according to claim 3, comprising:

A stretching sliding rod (24);

Means for adjusting the travel of the stretching sliding rod (24);

Control means that are designed to control the stretching rod (24) cyclically in terms of sliding from a rest position to an adjustable stretching end position so as to stretch the malleable wall of a hollow body (18), before returning to its rest position to begin a cycle following the stretching of another hollow body (18), Control means that are designed to detect whether an axial force that opposes the sliding of the stretching rod (24) at the end of travel is above a determined upper boundary;

wherein the control means are designed to estimate the axial force that opposes the sliding of the stretching rod (24) at the end of travel, and wherein said means for adjusting the travel comprise means for automatic subjecting of the stretching end position to the axial force that is measured at the end of stretching travel of a preceding hollow body, whereby the adjustment means automatically adjust the stretching end position.

17. Device (14) for forming hollow bodies (18) made of thermoplastic material by stretch blow molding for implementing the method according to claim 4, comprising:

A stretching sliding rod (24);

Means for adjusting the travel of the stretching sliding rod (24);

Control means that are designed to control the stretching rod (24) cyclically in terms of sliding from a rest position to an adjustable stretching end position so as to stretch the malleable wall of a hollow body (18), before returning to its rest position to begin a cycle following the stretching of another hollow body (18), Control means that are designed to detect whether an axial force that opposes the sliding of the stretching rod (24) at the end of travel is above a determined upper boundary;

wherein the control means are designed to estimate the axial force that opposes the sliding of the stretching rod (24) at the end of travel, and wherein said means for adjusting the travel comprise means for automatic subjecting of the stretching end position to the axial force that is measured at the end of stretching travel of a preceding hollow body, whereby the adjustment means automatically adjust the stretching end position.

18. Device (14) for forming hollow bodies (18) made of thermoplastic material by stretch blow molding for implementing the method according to claim 5, comprising:

A stretching sliding rod (24);

Means for adjusting the travel of the stretching sliding rod (24);

Control means that are designed to control the stretching rod (24) cyclically in terms of sliding from a rest position to an adjustable stretching end position so as to stretch the malleable wall of a hollow body (18), before returning to its rest position to begin a cycle following the stretching of another hollow body (18), Control means that are designed to detect whether an axial force that opposes the sliding of the stretching rod (24) at the end of travel is above a determined upper boundary;

wherein the control means are designed to estimate the axial force that opposes the sliding of the stretching rod (24) at the end of travel, and wherein said means for adjusting the travel comprise means for automatic subjecting of the stretching end position to the axial force that is measured at the end of stretching travel of a preceding hollow body, whereby the adjustment means automatically adjust the stretching end position.

19. Device (14) for forming hollow bodies (18) made of thermoplastic material by stretch blow molding for implementing the method according to claim 6, comprising:

A stretching sliding rod (24);

Means for adjusting the travel of the stretching sliding rod (24);

Control means that are designed to control the stretching rod (24) cyclically in terms of sliding from a rest position to an adjustable stretching end position so as to stretch the malleable wall of a hollow body (18), before returning to its rest position to begin a cycle following the stretching of another hollow body (18), Control means that are designed to detect whether an axial force that opposes the sliding of the stretching rod (24) at the end of travel is above a determined upper boundary;

wherein the control means are designed to estimate the axial force that opposes the sliding of the stretching rod (24) at the end of travel, and wherein said means for adjusting the travel comprise means for automatic subjecting of the stretching end position to the axial force that is measured at the end of stretching travel of a preceding hollow body, whereby the adjustment means automatically adjust the stretching end position.

20. Device (14) for forming hollow bodies (18) made of thermoplastic material by stretch blow molding for implementing the method according to claim 7, comprising:

A stretching sliding rod (24);

Means for adjusting the travel of the stretching sliding rod (24);

Control means that are designed to control the stretching rod (24) cyclically in terms of sliding from a rest position to an adjustable stretching end position so as to stretch the malleable wall of a hollow body (18), before returning to its rest position to begin a cycle following the stretching of another hollow body (18), Control means that are designed to detect whether an axial force that opposes the sliding of the stretching rod (24) at the end of travel is above a determined upper boundary;

wherein the control means are designed to estimate the axial force that opposes the sliding of the stretching rod (24) at the end of travel, and wherein said means for adjusting the travel comprise means for automatic subjecting of the stretching end position to the axial force that is measured at the end of stretching travel of a preceding hollow body, whereby the adjustment means automatically adjust the stretching end position.

\* \* \* \* \*